United States Patent [19]

Nakane et al.

[11] Patent Number: 5,091,259
[45] Date of Patent: Feb. 25, 1992

[54] ELECTRIC WIRE COATED WITH A HALOGEN-CONTAINING POLYESTER RESIN COMPOSITION

[75] Inventors: Toshio Nakane, Fuji; Kenji Hijikata, Mishima; Makoto Iiyama, Fuji; Yukihiko Kageyama, Fujinomiya; Michirou Naka, Fuji, all of Japan

[73] Assignee: Polyplastics Co., Ltd., Osaka, Japan

[21] Appl. No.: 606,720

[22] Filed: Oct. 31, 1990

Related U.S. Application Data

[62] Division of Ser. No. 151,802, Feb. 3, 1988, Pat. No. 4,987,167.

[30] Foreign Application Priority Data

Mar. 9, 1987 [JP] Japan .................................. 62-53717

[51] Int. Cl.$^5$ .......................... B32B 15/08; B27N 9/00
[52] U.S. Cl. ..................................... 428/457; 428/548; 428/480; 428/522; 428/920; 428/921
[58] Field of Search ............... 428/458, 457, 580, 522, 428/920, 921

[56] References Cited

U.S. PATENT DOCUMENTS 3,959,215  5/1976  Schneider .......................... 524/95

Primary Examiner—Joseph L. Schofer
Assistant Examiner—Jeffrey T. Smith
Attorney, Agent, or Firm—Birch, Stewart, Kolasch & Birch

[57] ABSTRACT

A halogen-containing polyester resin composition comprises a flame retardant aromatic polyester copolymer having a halogen content of 0.5–30% by weight which is produced by condensation polymerization reaction of:

(A) principally an aromatic dicarboxylic acid or an ester-forming derivative thereof,
(B) principally an aliphatic glycol or an ester-forming derivative thereof, and
(C) an ester-forming compound containing a halogen, and, in mixture therewith, 0.1–10% by weight of a bisoxazoline compound relative to the total weight of the composition.

21 Claims, No Drawings ics.
ELECTRIC WIRE COATED WITH A HALOGEN-CONTAINING POLYESTER RESIN COMPOSITION This application is a divisional of copending application Ser. NO. 07/151,802 filed on Feb. 3, 1988, is now U.S. Pat. No. 4,987,167.

BACKGROUND OF THE INVENTION

1. Field of the Invention

The present invention relates to a covering material for electric wires and, more particularly, to a polyester resin composition comprising a halogen-containing flame retardant aromatic polyester copolymer and a bisoxazoline compound in mixture therewith, which is not liable to loss of flexibility due to its thermal history and has excellent flame retarding properties, and to a covered electric wire using same.

2. Description of Related Art

Hitherto, rubber, polyvinyl chloride, polyethylene, polypropylene, nylon, and the like have been used as covering materials for electric wires, and above all, polyvinyl chloride has been largely used as a covering material from the view points of flame retardancy and mechanical strength. Recently, as environmental conditions become severer for use of these covering materials, higher performance characteristics have been required of such material, including, in addition to high heat resistance and good electrical properties, excellent flame retardancy and such a degree of thickness reducibility as is satisfactory enough to suit space saving purposes.

Fluoroplastics, crosslinked polyethylenes, and the like meet many of these requirements, but they have a disadvantage with respect to thickness reducibility. Further, fluoroplastics are expensive. As such, these resins cannot be considered to be satisfactory.

Much attention is being paid to polyethylene terephthalate and polybutylene terephthalate because they have good thickness reducibility, and further because they are well qualified with respect to mechanical strength characteristics (such as flexibility and wear resistance), heat resistance, and electrical properties. However, they are not well qualified in flame retardancy, and since these polyalkylene terephthalates are crystalline resins, they are liable to excessive deterioration in flexibility and impact strength and other mechanical strength characteristics as a consequence of their exposure to heat in the course of heat treatment after the process of wire covering and/or in the course of their being used under heat conditions. As such, it is necessary that their use at locations adjacent a source of heat or in environmental conditions which are likely to lead to heat accumulation should be avoided, and thus no small limitation is imposed upon the use of those resins as such.

With a view to overcoming such difficulty, an attempt has been made to reduce the crystallinity of such a resin even to a small degree by admixing an elastomer or a non-crystalline polymer. It has also been attempted to effect partial crosslinking so as to maintain the mechanical strength characteristics of such a resin.

Some improvement can be observed with the first mentioned attempt, but since the matrix of the crystalline resin remains as such, the resulting composition cannot withstand any long-time exposure to heat; and, a decrease in the proportion of the crystalline resin is likely to lead to some degradation in the mechanical properties of the composition, such as frictional wear characteristics.

With the second mentioned attempt, some improvement due to crosslinking can be found with respect to mechanical property stabilization, but since the property of flexibility is sacrificed and since a crosslinking reaction is involved, the process requires complicated control and the processability of the resulting composition is very adversely affected.

SUMMARY OF THE INVENTION

In view of the foregoing problems, the present inventors conducted extensive studies in order to obtain a covering material for wires which is not liable to loss of flexibility due to its thermal history and which is flame retardant and has good mechanical and electrical properties; and, as a result, they found that such covering material could be obtained by admixing a certain compound with a halogen-containing flame retardant aromatic copolyester; and this led to the present invention.

That is, the invention provides: a halogen-containing polyester resin composition comprising a flame retardant aromatic polyester copolymer having a halogen content of 0.5–30% by weight which is produced by condensation polymerization reaction of (A) principally an aromatic dicarboxylic acid or or an ester-forming derivative thereof, (B) principally an aliphatic glycol or an ester-forming derivative thereof, and (C) an ester-forming compound containing a halogen, and, in mixture therewith, 0.1–10% by weight of a bisoxazoline compound relative to the total weight of the composition; and an electric wire covered with said composition.

The invention composition comprises 90 to 99.9 percent by weight of the aromatic polyester and 0.1 to 10 percent by weight of the bisoxazoline compound.

It is extremely difficult indeed to satisfy, as in the present invention, various properties required for a covering material for electric wire covering applications, such as flame retardancy, frictional wear resistance, and flexibility properties (e.g., flex property and high extensibility), concurrently with such performance characteristics that the flexibility properties are not liable to be lost due to a thermal history of the material and that the original high extensibility and flex property can be retained even in a prolonged hot atmosphere. Indeed, it is surprising that a combination of a halogenated copolyester of polyalkylene terephthalate and a bisoxazoline compound in certain proportions is so effective in satisfying various properties required for wire covering materials and, more particularly, that incorporation of oxazoline can prevent the flexiblity properties from being lost by such thermal history and remarkably enhance the stability of the material in a long-term heating atmosphere.

DESCRIPTION OF THE PREFERRED EMBODIMENTS

The polyester copolymer composition used in the invention will now be described in detail.

Referring first to the constituents of the aromatic polyester copolymer as a base component of the covering material of the invention, constituent (A) is composed principally of an aromatic dicarboxylic acid or an ester-forming derivative thereof. A typical example of such acid is a terephthalic acid or a derivative thereof. In addition, if so required, dicarboxylic acids, such as isophthalic acid, naphthalene carboxylic acid, and naphthalene dicarboxylic acid, or their derivatives, aliphatic dicarboxylic acids, such as adipic acid, sebacic acid, trimellitic acid, and succinic acid, or their ester-forming derivatives, or aromatic hydroxy-carboxylic acids, such as hydroxy benzoic acid and hydroxy naphthoic acid, or their ester-forming derivatives may be supplementarily used.

Constituent (B) of the polyester copolymer in the invention is composed principally of an aliphatic diol or an ester forming derivative thereof. Typical examples of such diol are low molecular-weight glycols of $C_2-C_8$, such as ethylene glycol, 1,4-butylene glycol, 1,3-propane diol, 1,4-butene diol, 1,6-hexane diol, and 1,8-octoic diol. Further, high-molecular weight glycols, such as polyalkylene glycol oxide, polyethylene glycol oxide, and polybutylene glycol oxide, may be used in combination with such low-molecular weight glycol. Use of such high-molecular weight glycol in combination with such low-molecular-weight glycol is very effective for improvement in stretchability of the aromatic polyester as an electric wire covering material of the invention and for provision of flexing properties. In addition, aromatic alcohols, such as bisphenol A, 4,4-dihydroxybiphenyl, and a phospine acid having an aromatic diol group, alkylene oxide adduct alcohols, such as ethylene oxide 2 mol adduct of bisphenol A and propylene oxide 2 mol adduct of bisphenol A, and polyhydroxy compounds, such as glycerin and pentaerythritol, or their ester forming derivatives may be supplementarily used as a part of constituent (B).

The polyester copolymer in the invention is an aromatic polyester copolymer in which an ester-forming compound containing a halogen is used as a monomeric constituent (C), whereby the halogen is combined into the molecular structure of the copolymer. Examples of halogen-containing compounds useful for this purpose are shown hereinbelow. For the halogen in those compounds, bromine is particularly preferred.

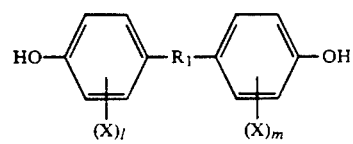

(1)

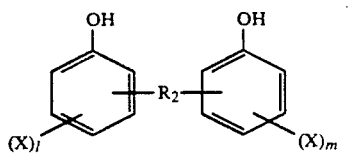

(2)

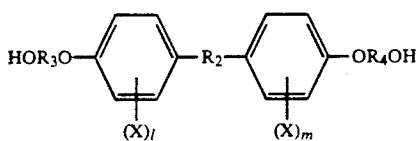

(3)

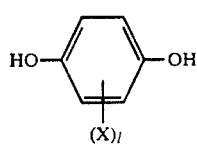

(4)

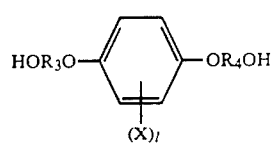

(5)

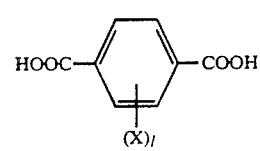

(6)

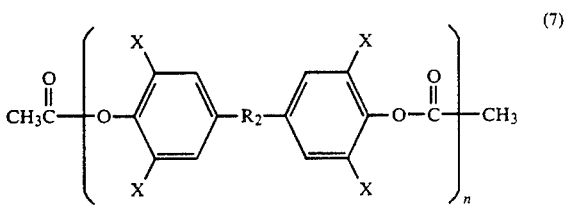

(7)

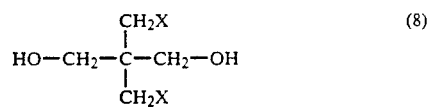

(8)

where,

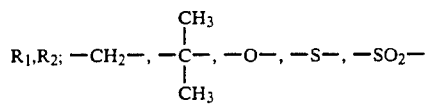

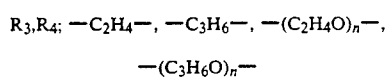

X: halogen
l, m: 1–4
n: integer of 1 or above

Halogen compounds preferred for incorporation as copolymer compounds are those expressed by the general formulas (1)–(7). Where the halogen is bromine, tetrabromobisphenol A and tetrabromobisphenol sulfone may be mentioned as examples of general formula (1); tetrabromobisphenol F as an example of general formula (2); ethylene oxide 2 mol adduct of tetrabromobisphenol A, propylene oxide 2 mol adduct of tetrabromobisphenol A, ethylene oxide 2 mol adduct of tetrabromobisphenol sulfone, and propylene oxide 2 mol adduct of tetrabromobisphenol sulfone as examples of general formula (3); tetrabromohydroquinone as an example of general formula (4); ethylene oxide 2 mol adduct of tetrabromohydroquinone as an example of general formula (5); tetrabromoterephthalic acid as an example of general formula (6); and polycarbonate of tetrabromobisphenol A as an example of general formula (7).

The molecular weight of such a halogen compound monomer for incorporation as a copolymer composition should be preferably more than 390. If the molecular weight is too small, the halogen compound monomer will not contribute toward improvement in the oxygen index as an index of flame retardancy; therefore, it is desirable that at least more than one aromatic ring be contained in a molecule.

Such halogen compound monomer is incorporated so that the copolyester to be produced will have a halogen content of 0.5–30 wt%, preferably 2–20 wt%. If the halogen content is less than 0.5 wt%, no satisfactory degree of flame retardancy can be obtained. A halogen content of more than 30 wt% is undesirable, because it will lower the mechanical properties.

The proportions of the monomers used for preparation of the polyester copolymer in the invention should be such that if the ester forming functional group in the halogen compound for constituent (C) is an alcohol group, the proportion of constituents (B) +(C) is 90–200 mol, preferably 95–150 mol, relative to 100 mol of constituent (A). If the ester forming functional group in the halogen compound for constituent (C) is a carboxylic acid group, the proportion of constituent (B) should be 90–200 mol, preferably 95–150 mol, relative to 100 mol of constituents (A) + (C).

If the conditions for use require a covering material with a higher oxygen index, the halogen content of the copolymer may be adjusted by suitably fixing the proportion of constituent (C), whereby it is possible to obtain one that can satisfy the oxygen index requirement.

Copolymers useful for the purpose of the invention may be produced by known polymerization techniques, such as melt polymerization, interfacial polymerization, and solid-phase polymerization, and those having an inherent viscosity of the order of 0.5–3.0 are useful.

The composition in accordance with the invention comprises such halogen-containing polyester copolymer as aforesaid and, in mixture therewith, a certain proportion of a bisoxazoline compound of the kind shown below.

The bisoxazoline compound is expressed by the following general formula (9):

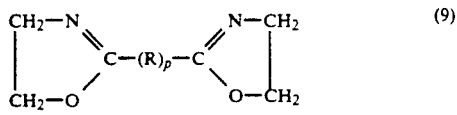

(where, R represents a bivalent organic group, p represents an integer of 0 or 1; hydrogen atoms may be replaced by alkyl or aryl groups.)

For the bisoxazoline compound expressed by general formula (9), the following may be mentioned by way of example: 2,2′-methylene-bis(2-oxazoline), 2,2′-ethylene-bis(2-oxazoline), 2,2′-ethylene-bis (4-methyl-2-oxazoline), 2,2′-propylene-bis (2-oxazoline), 2,2′-tetramethylene-bis(2-oxazoline), 2,2′-hexamethylene-bis(2-oxazoline), 2,2′-octamethylene-bis (2-oxazoline), 2,2′-p-phenylene-bis (2-oxazoline), 2,2′-p-phenylene-bis(4-methyl-2-oxazoline), 2,2′-p-phenylene-bis(4,4-dimethyl-2-oxazoline), 2,2′-p-phenylene-bis(4-phenyl-2-oxazoline), 2,2′-m-phenylene-bis(2-oxazoline), 2,2′-m-phenylene-bis(4-methyl-2-oxazoline), 2,2′-m-phenylene-bis (4,4-dimethyl-2-oxazoline), 2,2m-phenylene-bis(4-phenyl-2-oxazoline), 2,2′-o-phenylene-bis (2-oxazoline), 2,2′-phenyl-bis (4-methyl-2-oxazoline), 2,2′-bis(2-oxazoline), 2,2′-bis(4-methyl-2-oxazoline), 2,2′-bis(4-ethyl-2-oxazoline), and 2,2′-bis(4-phenyl-2-oxazoline). Such a bisoxazoline compound may be used in one kind alone or in a combination with two or more kinds.

Of these bisoxazoline compounds are preferred those in which R is an aromatic ring group, and more preferred are those in which R is a phenylene group. More particularly, 2,2′-m-phenylene-bis (2-oxazoline) is preferred.

The proportion of the bisoxazoline compound is 0.1–10 wt%, preferably 0.1–5 wt%, in relation to the total weight of the composition. If the proportion is too small, no meaningful effect can be obtained. If the proportion is too large, there will arise problems, such as an abnormal increase in viscosity and increased formation of decomposition products.

Such a bisoxazoline compound may be incorporated at the stage of producing aforesaid aromatic copolyester, or may be incorporated by admixture at the stage of pellet preparation.

The covering material used in the present invention exhibits excellent performance characteristics even if no particular additive is incorporated therein. However, in order to improve the performance characteristics of the covering material, it is possible to use various additives including stabilizers, such as antioxidant and ultraviolet light absorber, antistatic agent, flame-retardant agent, flame retarding auxiliary, colorants, such as dyes and pigments, and also lubricants, lubricating agents, crystallization accelerators (nucleating agents), and inorganics for purposes of fluidity and releasability improvement, wherever addition of any such agent is required. Addition of an antioxidant, in particular, will have greater effect for improvement in conjunction with the oxazoline.

Examples of stabilizers include hindered phenolic, amine, and phosphoric compounds.

Examples of hindered phenolic compounds are 2,2′-methylene-bis(4-methyl-6-t-butylphenol), hexamethylene glycol-bis(3,5-di-t-butyl-4-hydroxyhydrocinnamate), tetrahis-[methylene(3,5-di-t-butyl-4-hydroxyhydrocinnamate)] methane, triethylene glycol-bis-3-(3-t-butyl-4-hydroxy-5-methylphenyl)propionate, 1,3,5-trimethyl-2,4,6-tris-(3,5-di-t-butyl-4-hydroxybenzyl)-benzene, n-octadecyl-3-(4′-hydroxy-3′,5′-di-t-butyl-phenol) propionate, 4,4′-methylene-bis(2,6-di-t-butyl-phenol), 4,4′-butylidene-bis(6-t-butyl-3-methylphenol), 2,2′-thiodiethyl-bis[3-(3,5-di-t-butyl-4-hydrodyphenyl)-propionate, distearyl-3,5-di-t-butyl-4-hydroxybenzyl phosphonate, 2-t-butyl-6-(3-t-butyl-5-methyl-2-hydroxybenzyl}-4-methylphenyl acrylate; at least one or more kinds of these may be used. Of these compounds, hexamethylene glycol-bis(3,5-di-t-butyl-4-hydroxyhydrocinnamate), tetrakis[methylene(3,5-di-t-butyl-4-hydroxyhydrocinnamate)]methane, and triethylene glycol-bis-3-(3-t-butyl-4-hydroxy-5-methylphenyl)propionate are particularly preferred.

Examples of amine compounds are N-phenyl-N′-isopropyl-p-phenylene diamine, N,N′-diphenyl-p-phenylene diamine, 4,4′-bis(4-α,α-dimethyl benzyl) diphenyl amine, diphenylamine-acetone condensation reaction product, N-phenyl naphthylamine, and N,N′-di-β-naphthylphenylene diamine.

To give an example of aforesaid phosphoric compound, β phosphonite compound is mentioned which is expressed the following general formula (10):

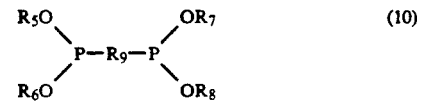

where, $R_5$, $R_6$, $R_7$, and $R_8$ represent an alkyl, substituted-alkyl, aryl, or substituted aryl group having 1–25 carbon atoms, and they may be identical with or different from one another. Examples of such group are methyl, ethyl, butyl, octyl, decryl, lauryl, tridecyl, stearyl, phenyl groups, and alkyl-and/or alkoxy-substituted phenyl groups. In the formula, $R_9$ represents a alkylene, substituted alkylene, arylene, or substituted arylene group having 4-33 carbon atoms. Examples of such group are butylene, octylene, phenylene, naphthylene, diphenylene groups, and a group expressed by the formula

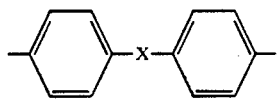

(where, X represents an oxy, sulfonyl, carbonyl, methylene, ethylidene, butylidene, isopropylene, or diazo group). A particularly preferred phosphonite compound is tetrakis(2,4-di-t-butylphenyl)-4,4'-diphenylene phosphonite.

The proportion of such compound is 0.01-5 wt%, preferably 0.1-3 wt%, relative to the total weight of the composition.

Useful flame-retarding auxiliaries are antimony compounds, such as antimony trioxide and antimony halide. Also, metallic compounds containing zinc or bismuth, magnesium hydroxide, and clay silicate, such as asbestos, may be used.

To give examples of useful inorganic materials, the following are mentioned: inorganic fibers, such as glass fiber, ceramic fiber, boron fiber, potassium titanate fiber, and asbestos; powdery and/or granular materials, such as calcium carbonate, highly dispersible silicate, alumina, aluminum hydroxide, tale, clay, mica, glass flakes, glass powder, glass beads, quartz powder, quartz sand, wollastonite, carbon black, barium sulfate, baked gypsum, silicon carbide, alumina, boron nitride, and silicon nitride; lamellar inorganic compounds; and whiskers.

Such an inorganic filler may be used in one kind or in a combination with two or more kinds.

Further, for purposes of improving the hot-melt extrusion coating properties, lubricating properties, and flexibility of the composition, it is possible to supplementarily incorporate into the composition one or more kinds of organic polymeric materials. Examples of such material are other polyesters, polyamides, polyolefins, and their copolymers; low molecular weight polyethylenes, polycarbonates, polyurethanes, rubber-like polymeric materials, such as butyl rubber and ABS; multiphase copolymers composed of a polyacrylate resin; and thermoplastic segment type copolyesters (in these examples, copolymers include graft copolymers).

The electric wire in accordance with the invention is produced by known techniques. Usually, the covering material is coated over a running line of conductor as it is extruded by hot-melt extrusion. There are two different cases, one in which the direction of run of the conductor and the direction of extrusion of the covering material are colinear, and the other in which a crosshead having a certain angular arrangement is used. The wire according to the invention can be manufactured in either case.

For an extruding operation, it is desirable to employ a screw-type extruder which allows easy control of the flow of the covering material.

In order to detect any thickness irregularity of the covering material, known techniques, such as X-ray and ultrasonic detection methods, are employed.

Any eccentricity of the composite material due to its thickness irregularity is expressed by concentricity ec. The greater the concentricity ec, the better. Preferably it should be more than 65%, more preferably 70% or above.

$$e_c = \frac{e_{min}}{e_{max}} \times 100$$

$e_{min}$: minimum thickness of coverage section
$e_{max}$: maximum thickness of coverage section Thickness irregularity control is performed by detecting such irregularity by means of an eccentricity detector and automatically or manually adjusting the clearance between the die and the conductor at the die center portion of the screw extruder accordingly, or by controlling the flow rate of the covering material together with the pressure and temperature conditions.

Use of an eccentricity-free head with the die is effective in minimizing the thickness irregularity.

In the process of manufacture, if so required, the covering material may be coated and shaped, then passed through a heating zone, in order to further increase the mechanical strength of the covering material. The temperature of the heating zone is lower than the melting point of the covering material, but higher than the glass transition point thereof.

ADVANTAGES OF THE INVENTION

The halogen-containing resin composition according to the invention presents considerable improvements over conventional polyester covering materials in that it is far much less liable to property deterioration due to heat exposure, and therefore it provides the following advantages:

(1) The covering material is highly flame-retardant and less liable to property deterioration due to a thermal history, and therefore it is effective for use in electric wire applications in areas related to heat source, transport equipment engines, and heating parts of electric appliances.

(2) The composition permits covering-thickness reduction without detriment to its machanical and electrical properties, and moreover it has good flex properties. This contributes remarkably toward effective utilization of a limited space. Therefore, the composition is particularly suitable for use in electric wire applications in various kinds of transport equipment, such as space rockets, aircrafts, and automobiles— which are highly information-integrated and limited in available space, electric appliances, computers, and information-related equipment.

(3) Since a halogen compound is incorporated in its copolymer component, the covering material of the invention is free from such leaching possibilities under high temperature conditions as may be seen with conventional covering materials incorporating a flame retardant. Therefore, the covering material of the invention has good appearance and configuration. Moreover, wire to wire blocking in the process of manufacture can be prevented, which means good saving in the cost of covering.

Because of these outstanding characteristics, the covering material according to the invention may be advantageously employed with various kinds of machinery, materials, and parts in which such properties are highly desired, in addition to the above cited fields of application.

EXAMPLES

The invention will be described further with reference to the following examples. Copolymers P, Q, and R used in the examples were prepared in the following way.

PREPARATION EXAMPLE 1

Preparation of Copolymer P

Into a reactor having an agitator, a nitrogen introduction pipe, and a distillation pipe were charged 970 parts by weight of dimethyl terephthalate, 513 parts by weight of butane diol, 158 parts by weight of an ethylene oxide 2 mol adduct of tetrabromobisphenol A, and 0.7 part by weight of tetrabutoxy titanium, and the mixture was stirred under a nitrogen gas stream at 160° C for 30 minutes. The temperature was gradually raised and the mixture was heated at temperatures of 200° C. to 270° C. under stirring for 2 hours. Then, after introduction of nitrogen was discontinued, the reactor was gradually subjected to pressure reduction so that the pressure in the reactor was reduced to 0.3 mmHg in 30 minutes; and agitation was effected under said pressure for 3 hours. The polymer thus obtained had an inherent viscosity of 1.0 and a bromine content of 6.5 wt%.

PREPARATION EXAMPLE 2

Preparation of Copolymer Q

Into a reactor having an agitator, a nitrogen introduction pipe, and a distillation pipe were charged 970 parts by weight of dimethyl terephthalate, 513 parts by weight of 1,4-butane diol, 171 parts by weight of a polypropylene oxide 2 mol adduct of tetrabromobisphenol sulfone, and 0.7 part by weight of tetrabutoxy titanium, and the mixture was stirred under a nitrogen gas stream at 160° C. for 30 minutes. The temperature was gradually raised and the mixture was heated at temperatures of 200° C. to 270° C. under stirring for 2 hours. Then, after introduction of nitrogen was discontinued, the reactor was gradually subjected to pressure reduction so that the pressure in the reactor was reduced to 0.3 mmHg in 30 minutes; and agitation was effected at 270° C. under said pressure for 3 hours. The polymer thus obtained had an inherent viscosity of 1.1 and a bromine content of 6.3 wt%.

PREPARATION EXAMPLE 3

Preparation of Copolymer R

Into a reactor having an agitator, a nitrogen introduction pipe, and a distillation pipe were charged 900 parts by weight of dimethyl terephthalate, 450 parts by weight of 1,4-butane diol, 50 parts by weight of a polybutylene oxide glycol having an average molecular weight of 400, 158 parts by weight of an ethylene oxide 2 mol adduct of tetrabromo bisphenol A, and 0.7 part by weight of tetrabutoxy titanium, and the mixture was stirred under a nitrogen gas stream at 180° C. for 30 minutes. The temperature was gradually raised and the mixture was heated at temperatures of 200° C. to 270° C. under stirring for 3 hours. Then, after introduction of nitrogen was discontinued, the reactor was gradually subjected to pressure reduction so that the pressure in the reactor was reduced to 0.5 mmHg in 15 minutes; and agitation was effected under said pressure for 6 hours. The polymer thus obtained had an inherent viscosity of 1.0 and a bromine content of 6.3 wt%.

EXAMPLE 1

One and a half parts by weight of 2,2'-m-phenylene-bis(2-oxazoline) were admixed in powder state with 98.5 parts by weight of copolymer P, and by employing a conventional extruder the mixture was extruded into a uniformly melt-mixed pellet. From the pellet thus obtained, a test specimen was prepared by employing an injection molding machine and in conventional manner. The specimen was evaluated in respect of its properties.

For each property aspect, measurement was carried out in the following manner.

Tensile strength and elongation (%) measurements were made according to ASTM D 638. Dielectric breakdown tests were made according to the short-term test method of ASTM D 149, and dielectric constant measurements were made according to DISO 1kHz. For flame retardancy, tests were made according to UL-94V; and where the flame died out within 30 sec, the specimen was rated o, and where the flame did not die out within 30 sec, the specimen was rated x. Oxygen index measurements were made according to JIS K7201. For surface configuration, the condition of the surface after exposure to 120° C. for 72 hours was observed, and those which showed such abnormal conditions as bleeding and blistering were rated x, whereas those showing no such condition were rated o.

Further, tensile test specimens were kept in a temperature controlled bath at 120° C., and their elongation and retained extensibility after 500 hours were also measured.

Further, electric wire specimens were prepared by coating each resin composition on a copper-made round compressed strand having an outer diameter of about 1.9 mm so that a 0.3 mm thick coat was formed on the strand. The specimens were kept in a temperature controlled bath at 120° C., and after 500 hours, they were subjected to bending 10 times at 90° and their post-bending surface conditions were examined for flex property evaluation. Those which showed cracks and fine cracks were rated x and those which showed no such abnormal indication were rated o.

Test results are shown in Table 1.

EXAMPLE 2

One and half parts by weight of 2,2'-m-phenylenbis(2-oxazoline) were admixed in powder state with 98.5 parts by weight of copolymer Q, and by employing a conventional extruder the mixture was extruded into a uniformly melt-mixed pellet. The resin composition thus obtained was evaluated in same ways as in Example 1. Results are shown in Table 1.

EXAMPLES 3 AND 4

One part by weight of triethylene glycol bis[3-(3-t-butyl-5-methyl-4-hydroxyphenyl) propionate](Irgauox ®245), as an antioxidant, was admixed with 100 parts by weight of each of the Example 1 and 2 compositions. Each composition thus obtained was evaluated in same manner as in Example 1. Results are shown in Table 1.

EXAMPLES 5-7

Each of the compositions was evaluated in same manner as in Example 1, except that the resin composition of each was changed as shown in Table 1. Results are shown in Table 1.

EXAMPLES 8

Evaluation was made in same manner as in Example 1, except that the copolymer was changed to R.

COMPARATIVE EXAMPLES 1-6

Evaluation was made in same way as in Example 1, except that the copolymers used and their resin compositions are as shown in Table 1. Results are shown in Table 1.

COMPARATIVE EXAMPLE 7

One and a half parts by weight of 2,2'-M-phenylene-bis(2-oxazoline) were added to 98.5 parts by weight of polybutylene terephthalate, and the mixture was made into test specimens for evaluation in the same way as in Example 1. Test results are shown in Table 1.

COMPARATIVE EXAMPLE 8

One and a half part by weight of 2,2'-m-phenylene-bis(2-oxazoline) and 12.5 parts by weight of deca-bromos-diphenyl ether were added to 86 parts by weight of polybutylene terephthalate, and the mixture was made into test specimens for evaluation in same way as in Example 1. Test results are shown in Table 1.

TABLE 1

| | Example | | | | | | | |
|---|---|---|---|---|---|---|---|---|
| | 1 | 2 | 3 | 4 | 5 | 6 | 7 | 8 |
| Resin composition | | | | | | | | |
| Resin used (parts by weight) | P | Q | P | Q | P | P | P | R |
| | 98.5 | 98.5 | 98.5 | 98.5 | 96 | 90 | 99.7 | 98.5 |
| Oxazoline (parts by weight) | 1.5 | 1.5 | 1.5 | 1.5 | 4 | 10 | 0.3 | 1.5 |
| Flame retardant (parts by weight) | — | — | — | — | — | — | — | — |
| Stabilizer (parts by weight) | — | — | — | — | — | — | — | — |
| Dielectric breakdown (kV/mm) | 16 | 16 | 16 | 16 | 17 | 16 | 17 | 16 |
| Dielectric constant | 3.2 | 3.1 | 3.2 | 3.1 | 3.2 | 3.2 | 3.2 | 3.2 |
| Flame retardancy | ○ | ○ | ○ | ○ | ○ | ○ | ○ | ○ |
| Oxygen index | 27 | 27 | 27 | 27 | 27 | 27 | 27 | 27 |
| Surface configuration | ○ | ○ | ○ | ○ | ○ | ○ | ○ | ○ |
| Tensile strength (kg/cm$^2$) | 579 | 567 | 579 | 564 | 585 | 520 | 549 | 465 |
| Elongation (%) | 320 | 340 | 320 | 340 | 310 | 170 | 347 | 510 |
| After 500 hr exposure at 120° C. | | | | | | | | |
| Elongation (%) | 280 | 285 | 284 | 306 | 267 | 117 | 131 | 419 |
| Retained extensibility (%) | 87 | 84 | 90 | 90 | 89 | 69 | 38 | 82 |
| Flex property | ○ | ○ | ○ | ○ | ○ | ○ | ○ | ○ |

| | Comparative Example | | | | | | | |
|---|---|---|---|---|---|---|---|---|
| | 1 | 2 | 3 | 4 | 5 | 6 | 7 | 8 |
| Resin composition | | | | | | | | |
| Resin used (parts by weight) | P | Q | P | Q | R | R | PBT | PBT |
| | 100 | 100 | 99 | 99 | 100 | 99 | 98.5 | 86 |
| Oxazoline (parts by weight) | — | — | — | — | — | — | 1.5 | 1.5 |
| Flame retardant (parts by weight) | — | — | — | — | — | — | — | 12.5 |
| Stabilizer (parts by weight) | — | — | 1.0 | 1.0 | — | 1.0 | — | — |
| Dielectric breakdown (kV/mm) | 17 | 17 | 17 | 17 | 17 | 17 | 14 | 14 |
| Dielectric constant | 3.2 | 3.2 | 3.2 | 3.2 | 3.3 | 3.3 | 3.3 | 3.1 |
| Flame retardancy | ○ | ○ | ○ | ○ | ○ | ○ | x | ○ |
| Oxygen index | 27 | 27 | 27 | 27 | 27 | 27 | 22 | 27 |
| Surface configuration | ○ | ○ | ○ | ○ | ○ | ○ | ○ | x |
| Tensile strength (kg/cm$^2$) | 543 | 550 | 543 | 550 | 450 | 451 | 530 | 540 |
| Elongation (%) | 350 | 345 | 350 | 345 | 550 | 548 | 300 | 72 |
| After 500 hr exposure at 120° C. | | | | | | | | |
| Elongation (%) | 77 | 79 | 102 | 114 | 110 | 148 | 246 | 50 |
| Retained extensibility (%) | 22 | 23 | 29 | 33 | 20 | 27 | 82 | 69 |
| Flex property | x | x | x | x | x | x | ○ | x |

Agent: Kaoru Furuya

What is claimed is:

1. An electric wire having coated thereon a halogen-containing polyester resin composition, comprising:
   (i) a flame retardant aromatic polyester copolymer having a halogen content of 0.5-30% by weight which is produced by a condensation polymerization reaction of the following groups:
   (A) an aromatic dicarboxylic acid or an ester-forming derivative thereof,
   (B) an aliphatic glycol or an ester-forming derivative thereof, and
   (C) an ester-forming compound containing a halogen, and, in mixture with the polyester of group (i),
   (ii) 0.1-10% by weight of a bisoxazoline compound relative to the total weight of the composition.

2. The electric wire as set forth in claim 1, wherein the halogen of the resin composition is bromine.

3. The electric wire as set forth in claim 1 or 2, wherein the aliphatic glycol (B) is a low molecular weight glycol of $C_2$-$C_8$.

4. The electric wire as set forth in claim 1 or 2, wherein the aliphatic glycol (B) comprises a low molecular weight glycol of $C_2$-$C_8$ and a polyalkylene glycol oxide having a molecular weight of 200-4000.

5. The electric wire as set forth in claim 3, wherein the low molecular weight glycol of $C_2$-$C_8$ comprises a glycol selected from the group consisting of ethylene glycol, 1,4-butylene glycol, 1,4-butene glycol and mixtures thereof.

6. The electric wire as set forth in claim 1, wherein the bisoxazoline is an m-phenylene bisoxazoline.

7. The electric wire as set forth in claim 1, wherein said composition further contains 0.1–3% by weight of a stabilizer relative to the total weight thereof.

8. The electric wire as set forth in claim 1, wherein group (A) is a terephthalic acid or a derivative thereof.

9. The electric wire as set forth in claim 1, wherein the halogen containing compound of group (C) is selected from the group consisting of formulas (1)–(8):

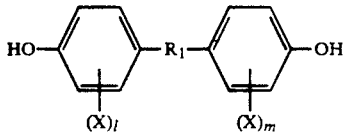
(1)

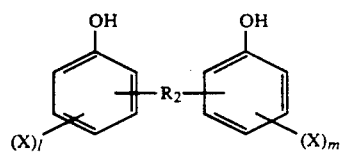
(2)

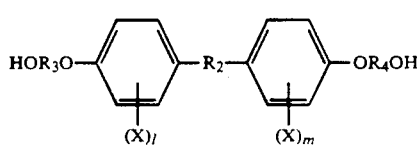
(3)

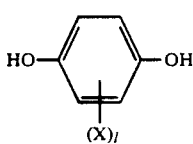
(4)

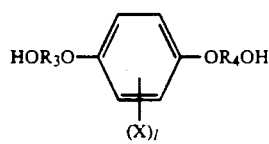
(5)

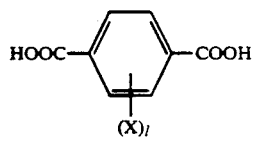
(6)

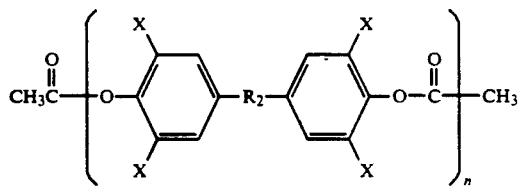
(7)

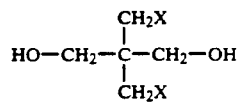
(8)

where, $R_1, R_2$: $-CH_2-$,

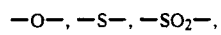

$R_3, R_4$: $-C_2H_4-$, $-C_3H_6-$, $-(C_2H_4O)_n-$, $-(C_3H_6O)_n-$

X: halogen l, m: 1–4 n: integer of 1 or above.

10. The electric wire as set forth in claim 1, wherein the molecular weight of the ester-forming compound containing a halogen is greater than 390.

11. The electric wire as set forth in claim 1, wherein the halogen content of said composition is 2–20 wt%.

12. The electric wire as set forth in claim 1, wherein an ester forming functional group in the halogen compound for group (C) is an alcohol group and the proportion of groups (B) and (C) is 90–200 mol relative to 100 mol of group (A).

13. The electric wire as set forth in claim 1, wherein an ester forming functional group in the halogen compound for group (C) is a carboxylic acid group and the proportion of group (B) is 90–200 mol relative to 100 mol of groups (A) and (C).

14. The electric wire as set forth in claim 1, wherein the bisoxazoline compound is represented by formula (9):

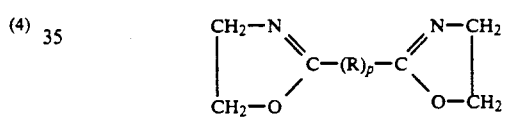

wherein, R represents a bivalent organic group, p represents an integer of 0 or 1; and hydrogen atoms may be replaced by alkyl or aryl groups.

15. The electric wire as set forth in claim 1, wherein the bisoxazoline compound is selected from the group consisting of 2,2'-methylene-bis(2-oxazoline), 2,2'-ethylene-bis(2-oxazoline), 2,2'-ethylene-bis(4-methyl-2oxazoline), 2,2'-propylene-bis(2-oxazoline), 2,2'-tetramethylene-bis(2-oxazoline), 2,2'-hexamethylene-bis(2-oxazoline), 2,2'-octamethylene-bis(2-oxazoline), 2,2'-p-phenylene-bis(2-oxazoline), 2,2'-p-phenylene-bis(4-methyl-2-oxazoline), 2,2'-p-phenylene-bis(4,4-dimethyl-2-oxazoline), 2,2'-p-phenylene-bis(4-phenyl-2-oxazoline), 2,2'-m-phenylene-bis(2-oxazoline), 2,2'-m-phenylene-bis(4-methyl-2-oxazoline), 2,2'-m-phenylene-bis(4,4-dimethyl-2-oxazoline), 2,2'-m-phenylene-bis(4-phenyl-2-oxazoline), 2,2'-o-phenylene-bis(2-oxazoline), 2,2'-phenyl-bis(4-methyl-2-oxazoline), 2,2'-bis(2-oxazoline), 2,2'-bis(4-methyl-2-oxazoline), 2,2'-bis(4-ethyl-2-oxazoline), 2,2'-bis(4phenyl-2-oxazoline) and combinations thereof.

16. The electric wire as set forth in claim 1, wherein group (A) further comprises an aliphatic dicarboxylic acid or ester-forming derivative thereof, or an aromatic hydroxy-carboxylic acid or ester-forming derivative thereof.

17. The electric wire as set forth in claim 1, wherein group (B) further comprises an aromatic alcohol or ester-forming derivative thereof, an alkylene oxide adduct alcohol or ester-forming derivative thereof, glycerin or ester-forming derivative thereof, or pentaerythritol or ester-forming derivative thereof.

18. The electric wire as set forth in claim 3, wherein group (B) further comprises a high molecular weight glycol.

19. The electric wire according to claim 1, wherein the halogen is bromine.

20. The electric wire according to claim 1 or 19, wherein the electric wire is a low-voltage wire.

21. The electric wire according to claim 20, wherein the electric wire is an automotive low-voltage wire.

* * * * *